(12) United States Patent
Wang (10) Patent No.: US 11,161,261 B2
(45) Date of Patent: Nov. 2, 2021

(54) SCISSORS

(71) Applicants: HANGZHOU GREAT STAR TOOLS CO., LTD., Hangzhou (CN); HANGZHOU GREAT STAR INDUSTRIAL CO., LTD., Hangzhou (CN)

(72) Inventor: Weiyi Wang, Hangzhou (CN)

(73) Assignees: HANGZHOU GREAT STAR TOOLS CO., LTD.; HANGZHOU GREAT STAR INDUSTRIAL CO., LTD.

( * ) Notice: Subject to any disclaimer, the term of this patent is extended or adjusted under 35 U.S.C. 154(b) by 65 days.

(21) Appl. No.: 16/284,051

(22) Filed: Feb. 25, 2019

(65) Prior Publication Data

US 2019/0184585 A1  Jun. 20, 2019

Related U.S. Application Data (63) Continuation-in-part of application No. 14/369,971, filed as application No. PCT/CN2014/073296 on Mar. 12, 2014, now abandoned.

(30) Foreign Application Priority Data

Jan. 22, 2019  (CN) .......................... 201920155699.7

(51) Int. Cl.
  *B26B 13/12*    (2006.01)
  *B26B 13/28*    (2006.01)
  (Continued)

(52) U.S. Cl.
  CPC ................ *B26B 13/12* (2013.01); *A01G 3/02* (2013.01); *A01G 3/021* (2013.01); *B26B 13/16* (2013.01); *B26B 13/28* (2013.01)

(58) Field of Classification Search
  CPC ......... B26B 13/00; B26B 13/06; B26B 13/12; B26B 13/16; B26B 13/26; B26B 13/28; A01G 3/02–0255
  (Continued)

(56) References Cited

U.S. PATENT DOCUMENTS

| 125,041 A | 3/1872 | Gardner |
| D34,097 S | 2/1901 | Smith |

(Continued)

FOREIGN PATENT DOCUMENTS

| CN | 2328485 Y | 7/1999 |
| CN | 201231493 Y | 5/2009 |

(Continued)

*Primary Examiner* — Jason Daniel Prone
(74) *Attorney, Agent, or Firm* — Hovey Williams LLP (57) ABSTRACT

Scissors including handles and scissors heads. The handles include a first handle and a second handle, and the scissors heads include a first scissors head and a second scissors head. The first scissors head is provided with a first blade and extends from one end of the first handle, and the second scissors head is provided with a second blade and extends from one end of the second handle. The first scissors head is pivotally hinged to the second scissors head via a pivoting structure, and the first scissors head and the second scissors head have a small width to thickness ratio at the connection between the scissors heads and the pivoting structure. The scissors increase the rigidity of the scissors head, enhance the shear-compression intensity of the scissors, facilitate the cutting of thick objects, and meet the requirements of various objects to be operated.

3 Claims, 7 Drawing Sheets

(51) Int. Cl.
   *B26B 13/16* (2006.01)
   *A01G 3/02* (2006.01)

(58) Field of Classification Search
   USPC .................................................. 30/262; D8/57
   See application file for complete search history.

(56) References Cited

U.S. PATENT DOCUMENTS

| | | | |
|---|---|---|---|
| 1,083,871 A | | 1/1914 | Van Tine |
| 1,529,916 A | * | 3/1925 | Rauh ................... A01G 3/02 |
| | | | 30/262 |
| D100,377 S | | 7/1936 | Lincoln |
| 2,189,211 A | * | 2/1940 | Lind ................... A01G 3/02 |
| | | | 30/262 |
| 2,392,118 A | | 1/1946 | Cacarillo |
| 2,544,197 A | * | 3/1951 | Vosbikian et al. ...... B26B 13/16 |
| | | | 30/262 |
| 2,577,316 A | | 12/1951 | Ern, Jr. |
| 2,589,050 A | | 3/1952 | Carlson et al. |
| 2,650,423 A | * | 9/1953 | Phillips ................... B26B 13/16 |
| | | | 30/262 |
| 2,741,841 A | | 4/1956 | Egeth |
| 3,057,063 A | | 10/1962 | Griffiths et al. |
| D217,424 S | | 5/1970 | Sorrell et al. |
| 3,834,022 A | * | 9/1974 | Students ................ B26B 13/28 |
| | | | 30/261 |
| 3,869,793 A | * | 3/1975 | Ferguson ................... B25B 7/14 |
| | | | 30/262 |
| D237,937 S | | 12/1975 | Backstrom et al. |
| D238,650 S | | 2/1976 | Koblick et al. |
| 4,150,484 A | * | 4/1979 | Hildebrandt ............ B26B 13/16 |
| | | | 30/254 |
| 4,422,240 A | | 12/1983 | Wallace et al. |
| D310,469 S | | 9/1990 | Dressler |
| 4,980,975 A | * | 1/1991 | Hodson ................... B26B 13/16 |
| | | | 30/262 |
| 5,179,783 A | * | 1/1993 | Melter ................... B26B 13/16 |
| | | | 30/262 |
| D338,604 S | | 8/1993 | Ramsey |
| D352,561 S | | 11/1994 | Johansson |
| 5,426,857 A | * | 6/1995 | Linden ................... A01G 3/02 |
| | | | 30/262 |
| 5,628,115 A | * | 5/1997 | Hebert ................... B26B 13/28 |
| | | | 30/262 |
| 5,774,991 A | * | 7/1998 | Shi ........................ B26B 13/16 |
| | | | 30/262 |
| 6,446,344 B1 | * | 9/2002 | Gontar ................... A01G 3/02 |
| | | | 30/262 |
| D506,116 S | | 6/2005 | Adachi |
| D523,307 S | | 6/2006 | Chang |
| D554,458 S | | 11/2007 | Wittke-Kothe |
| 8,079,150 B2 | * | 12/2011 | Huang ................... A01G 3/02 |
| | | | 30/262 |
| D651,494 S | | 1/2012 | Bhasin |
| D651,495 S | | 1/2012 | Bhasin |
| D680,833 S | | 4/2013 | Bhasin |
| D680,836 S | | 4/2013 | Bhasin |
| 8,677,631 B2 | | 3/2014 | Hanakawa |
| 10,136,583 B2 | * | 11/2018 | Dechant ............... B26B 13/285 |
| 10,611,040 B2 | * | 4/2020 | Huang ................... B26B 13/16 |
| 2002/0124415 A1 | | 9/2002 | Mizutani et al. |
| 2004/0000058 A1 | | 1/2004 | Shyr |
| 2004/0010924 A1 | * | 1/2004 | Hung ................... B26B 13/005 |
| | | | 30/255 |
| 2007/0144015 A1 | | 6/2007 | Peterson |
| 2008/0184567 A1 | * | 8/2008 | Jou ........................ A01G 3/02 |
| | | | 30/262 |
| 2009/0277019 A1 | * | 11/2009 | Mueller ................ B26B 13/16 |
| | | | 30/262 |
| 2013/0017737 A1 | | 1/2013 | Ballinger |
| 2014/0033542 A1 | | 2/2014 | Covel et al. |
| 2015/0217462 A1 | | 8/2015 | Cotter |
| 2015/0250105 A1 | | 9/2015 | Papworth |
| 2016/0185000 A1 | * | 6/2016 | Huang ................... B26B 13/16 |
| | | | 30/262 |
| 2017/0001319 A1 | * | 1/2017 | Wang ..................... A01G 3/02 |
| 2019/0082607 A1 | * | 3/2019 | Dechant ............... B26B 13/06 |
| 2020/0009750 A1 | * | 1/2020 | Heinsohn ............ B26B 13/28 |

FOREIGN PATENT DOCUMENTS

| | | |
|---|---|---|
| CN | 201617024 U | 11/2010 |
| CN | 102528826 A | 7/2012 |
| CN | 102601806 A | 7/2012 |
| CN | 103586890 A | 2/2014 |
| CN | 203875907 U | 10/2014 |
| JP | 09168673 A | 6/1997 |
| JP | 2004073310 A | 3/2004 |

* cited by examiner

SCISSORS

CROSS-REFERENCE TO RELATED APPLICATION

This application is a continuous-in-part of U.S. patent application Ser. No. 14/369,971, which is a national phase application of PCT/CN2014/073296 filed Mar. 12, 2014, incorporated herein by reference.

This application claims priority to and the benefit of Chinese Utility Model Application Number 201920155699.7, filed on Jan. 22, 2019, which is incorporated herein by reference.

TECHNICAL FIELD

The present invention relates to the technical field of mechanical tools, and in particular to scissors.

BACKGROUND ART

In the technical field of mechanical tools, the scissors are common hand-operated tools. An operator applies pressure to a first handle and a second handle of the scissors to effect relative movement of a first scissors head and a second scissors head, and blades of the scissors heads act on an object to cut the object. After the end of the application of the pressure, in order to separate the first scissors head from the second scissors head, the operator applies pulling forces to the first handle and the second handle such that the first handle and the second handle are pulled apart by a certain distance. For ease of operation, such scissors are modified by those skilled in the art, with a spring being externally arranged between the first handle and the second handle so that when pressure is applied to one side, the spring would generate a force against the pressure, thereby causing shear-compression forces applied to the object from the blades of the scissors heads to be more uniform, and after the end of the application of the pressure to the one side, the first handle and the second handle are automatically sprung back under the action of the spring, so that the first scissors head and the second scissors head are separated by a certain distance.

However, the scissors head of such scissors is generally formed by sheet metal stamping, the stamping process of the sheet metal generally requires that the width to thickness ratio of the part to be stamped is about 1.0, and the larger the ratio, the more favorable the processing, so that the thicknesses of parts of the scissors head except the blade are substantially the same, the width to thickness ratio of the scissors head is large, the top end of the blade is blunt, and the shape is cumbersome; such a scissors head requires a large operation space and cannot meet the operational requirements for a narrow space; and the shear-compression intensity of the blade of the scissors head is limited, so that it is difficult to cut thick objects. It can be seen that the head of the scissors needs to be shaper and more easy to use, the contradiction between the two cannot be solved by the stamping process, and the scissors head has to be stamped first and then processed by other processes to meet the use requirements of the scissors. Therefore, in order to increase the shear strength of the scissors, the production cost of the prior art is high. Moreover, since the spring is externally arranged between the first handle and the second handle, the space occupied by the entire scissors is large; such an external spring is prone to damage, thereby affecting the service life of the scissors; and when the object is being sheared and compressed, it is necessary to apply a large force to the first handle and the second handle to overcome the resistance of the spring.

Therefore, those skilled in the art are committed to developing scissors which have a more compact structure, have a better shear-compression effect, and are more comfortable to operate.

SUMMARY OF THE INVENTION

In view of the above drawbacks of the prior art, the technical problem to be solved by the present invention is to provide scissors.

To achieve the above object, the present invention provides scissors, which comprise handles and scissors heads, the handles comprising a first handle and a second handle, the scissors heads comprising a first scissors head and a second scissors head, the first scissors head being provided with a first blade and extending from one end of the first handle, the second scissors head being provided with a second blade and extending from one end of the second handle, and the first scissors head being pivotally hinged to the second scissors head via a pivoting structure, wherein the first scissors head has a width to thickness ratio of no more than 8.0 at the connection between the scissors heads and the pivoting structure. The width to thickness ratio refers to the ratio of the width to the thickness of the scissors head.

Preferably, the first scissors head has a width to thickness ratio of no more than 6.0 at the connection between the scissors heads and the pivoting structure. More preferably, the first scissors head has a width to thickness ratio of no more than 4.0 at the connection between the scissors heads and the pivoting structure.

Preferably, the second scissors head has a width to thickness ratio of no more than 8.0 at the connection between the scissors heads and the pivoting structure.

Preferably, the second scissors head has a width to thickness ratio of no more than 6.0 at the connection between the scissors heads and the pivoting structure. More preferably, the second scissors head has a width to thickness ratio of no more than 4.0 at the connection between the scissors heads and the pivoting structure.

Preferably, the first scissors head and the second scissors head are formed by forging.

Preferably, the scissors heads have a thickness of 3-8 mm at a pivot connection. Preferably, the scissors heads have a thickness of 4-6 mm at the pivot connection. More preferably, the scissors heads have a thickness of 5 mm at the pivot connection.

Preferably, the first scissors head is integrally formed with the first handle, and the second scissors head is integrally formed with the second handle.

Preferably, the first blade and/or the second blade are/is provided with teeth.

Preferably, the scissors are provided with a torsion spring located between the first scissors head and the second scissors head, the torsion spring being arranged such that the torsion spring does not deform when there is no external force applied to the handle, and the torsion spring is deformed when there is an external force applied to the handle.

More preferably, the torsion spring has an annular portion, a first extension portion and a second extension portion, the first scissors head is provided with a first slot, the second scissors head is provided with a second slot, a part of the annular portion and the first extension portion of the torsion spring are embedded into the first slot, and another part of the annular portion and the second extension portion of the torsion spring are embedded into the second slot.

Preferably, the pivoting structure comprises a bolt and a nut, the first slot is internally provided with a first hole, the second slot is internally provided with a second hole, the first hole and the second hole correspond to each other, and the scissors are provided with a bolt passing through the first hole and the second hole, the bolt being fixed by a nut.

More preferably, the pivoting structure is further provided with a washer, the washer is provided with a through hole, and the bolt passes through the first hole, the second hole and the through hole of the washer and is fixed by the nut; and the washer is provided with an uneven texture to enhance the friction between the washer and the nut, so as to improve the fastening effect of the nut.

Preferably, the first handle and the second handle are externally coated with a coating layer.

Preferably, the first scissors head is provided with a first blade and a first outer edge opposite the first blade, with a pointed head being provided between the first blade and the first outer edge; and the second scissors head is provided with a second blade and a second outer edge opposite the second blade, with a pointed head being provided between the second blade and the second outer edge.

More preferably, the pointed head of the first scissors head has a width to thickness ratio of no more than 0.5. The width to thickness ratio of the pointed head is the ratio of the width to the thickness of the pointed head.

More preferably, the pointed head of the second scissors head has a width to thickness ratio of no more than 0.5. It can be seen that the head of the scissors head of the scissors of the present invention can be made narrower and thicker than the head of the scissors head of the existing scissors under the same requirement of rigidity, and is a pointed head.

Preferably, the thickness of the part between the first blade and the first outer edge is greater than the thickness at the first outer edge, and the thickness of the part between the second blade and the second outer edge is greater than the thickness at the second outer edge.

More preferably, the part between the first blade and the first outer edge of the first scissors head is provided, from the inside to the outside, with faces respectively having different inclinations. From the inside to the outside is the direction from the blade to the outer edge of the respective scissors head. The inclination is an included angle between the face of the scissors head and the blade thereof.

More preferably, the part between the second blade and the second outer edge of the second scissors head is provided, from the inside to the outside, with faces respectively having different inclinations. From the inside to the outside is the direction from the blade to the outer edge of the respective scissors head.

Further, the faces having different inclinations of the first scissors head have different width to thickness ratios.

Further, the faces having different inclinations of the second scissors head have different width to thickness ratios.

Further, the part between the first blade and the first outer edge of the first scissors head is provided, from the inside to the outside, with a first face, a second face, a third face and a fourth face respectively having different inclinations.

Still further, the structure of the second scissors head is the same as that of the first scissors head.

Preferably, the second scissors head or the second handle is provided with a retaining component having a first end and a second end, the first end of the retaining component is pivotally connected to the second scissors head or the second handle, and the second end of the retaining component is arranged such that when heads of the first scissors head and the second scissors head are aligned, the second end rotates about the first end and abuts against the first scissors head to prevent the first scissors head from rotating.

Preferably, the scissors further comprise a locking cooperation part integrally formed with the first scissors head, the locking cooperation part being provided with an inclined face and a recessed portion. When the handles are brought together, the inclined face of the locking cooperation part can automatically slide the locking device to avoid damage to the locking device; the integral formation of the locking cooperation part and the first scissors head enables a very good stress distribution between the locking cooperation part and the first scissors head; and the recessed portion is used for engaging the locking device to prevent the locking device from being insecurely locked or automatically opened when in the locked state.

Preferably, the scissors further comprise a locking device, wherein a first end of the locking device is rotatably connected to the second scissors head; a second end of the locking device is configured to rotate about the first end of the locking device; and the scissors further comprise a stop portion arranged on the second scissors head, the stop portion being configured to prevent the locking device from rotating beyond a locked position. The locking device cooperates with the locking cooperation part to lock the first scissors head and the second scissors head of the scissors when they are brought together.

Further, the recessed portion is a locking notch arranged in the inclined face of the locking cooperation part, and a first face of the locking notch forms an outwardly-extending protruding tip with the inclined face of the locking cooperation part, the protruding tip being configured to pass through the second end of the locking device and extend outwardly when the locking device is in the locked position. The term "outwardly" herein refers to the direction facing away from the scissors head. When the scissors are in the locked state, the locking device is embedded into this locking notch, so that the locking device can be prevented from being automatically opened in the locked state; and when the scissors are in the locked state, the protruding tip passing through the locking device makes the locking securer, and the protruding tip is integrally formed with the first scissors head, so that the stress distribution is uniform, and the protruding tip is not easily bent or broken.

Further, the locking device comprises a U-shaped component, an opening end of the U-shaped component clamps two opposite sides of the second scissors head, and the opening end of the U-shaped component is rotatably connected to the two opposite sides of the second scissors head; and a U-shaped end of the U-shaped component is configured to cooperate with the locking notch.

Further, the U-shaped component is further provided with one or more outwardly protruding portions. The protruding portion may facilitate manual rotation of the U-shaped component; at the same time, when the scissors are from the locked state to the open state, this protruding portion may fall onto the first handle, and the impulsive force due to the U-shaped component falling onto the first handle in the open state is buffered.

Preferably, the scissors further comprise a locking device, wherein a first end of the locking device is rotatably connected to the second scissors head; a second end of the locking device is configured to rotate about the first end of the locking device; and the scissors further comprise a stop portion arranged on the locking device, the stop portion being configured to prevent the locking device from rotating beyond a locked position. The locking device cooperates with the locking cooperation part to lock the first scissors head and the second scissors head of the scissors when they are brought together.

Further, the recessed portion is a locking groove provided in a side face of the locking cooperation part, the locking groove being configured to extend outwardly through the inclined face of the locking cooperation part; and a first face of the locking groove forms an outwardly-extending protruding tip with the inclined face of the locking cooperation part, the protruding tip being configured to pass through the second end of the locking device and extend outwardly when the locking device is in the locked position. The term "outwardly" herein refers to the direction facing away from the scissors head. When the scissors are in the locked state, the locking device is embedded into this locking groove, so that the locking device can be prevented from being automatically opened in the locked state; and when the scissors are in the locked state, the protruding tip passing through the locking device makes the locking securer, and the protruding tip is integrally formed with the first scissors head, so that the stress distribution is uniform.

Further, the locking device is provided as a hook; and the first end of the hook is rotatably connected to the second scissors head, and the second end of the hook is provided with an inwardly bent portion, the bent portion being configured to be engaged in the locking groove when the locking device is in a locked state. The term "inwardly" herein refers to the direction facing toward the scissors head.

Further, a second lateral end of the hook is provided with an inwardly bent portion, and the bent portion is provided as the stop portion. The bent portion is configured to prevent the hook from rotating beyond the locked position. The term "inwardly" herein refers to the direction facing toward the scissors head.

Further, a first lateral end of the hook is provided with an outwardly bent portion. The term "outwardly" herein refers to the direction facing away from the scissors head. This bent portion may facilitate manual rotation of the hook; at the same time, when the scissors are from the locked state to the open state, this bent portion may fall onto the first handle, and the impulsive force due to the hook falling onto the first handle in the open state is buffered.

Technical Effects

The scissors provided by the present invention are formed by forging. This allows the scissors head to have a pointed head to extend into a narrow operation space; the scissors head has a smaller width to thickness ratio, which greatly increases the rigidity of the scissors head, enhances the shear-compression intensity of the scissors, and facilitates the cutting of thick objects; and the thickening of the part between the blade of the scissors head and the outer edge thereof further enhances the endurance of the scissors head.

The scissors provided by the present invention have a built-in torsion spring, and such an arrangement makes the torsion spring not prone to damage, the shape of the entire scissors simple, and the structure compact; and when the object is being sheared and compressed, the resistance of the spring can be overcome just by applying appropriate forces to the first handle and the second handle, so that the scissors are comfortable to use; and after the end of application of the forces to the handles, the torsion spring restores its shape, so that the first scissors head and the second scissors head are separated for the next operation.

The scissors provided by the present invention are further provided with a retaining component, so that the first scissors head and the second scissors head are brought together when the scissors are not used, and the scissors are convenient to carry.

The scissors provided by the present invention are provided with a locking device and a locking cooperation part matching same, for locking the first scissors head and the second scissors head of the scissors when they are brought together.

The concept, the specific structure and the technical effects of the present invention will be further described in conjunction with the accompanying drawings in order to fully understand the objects, features and effects of the present invention.

DETAILED DESCRIPTION OF EMBODIMENTS

Figure 1:
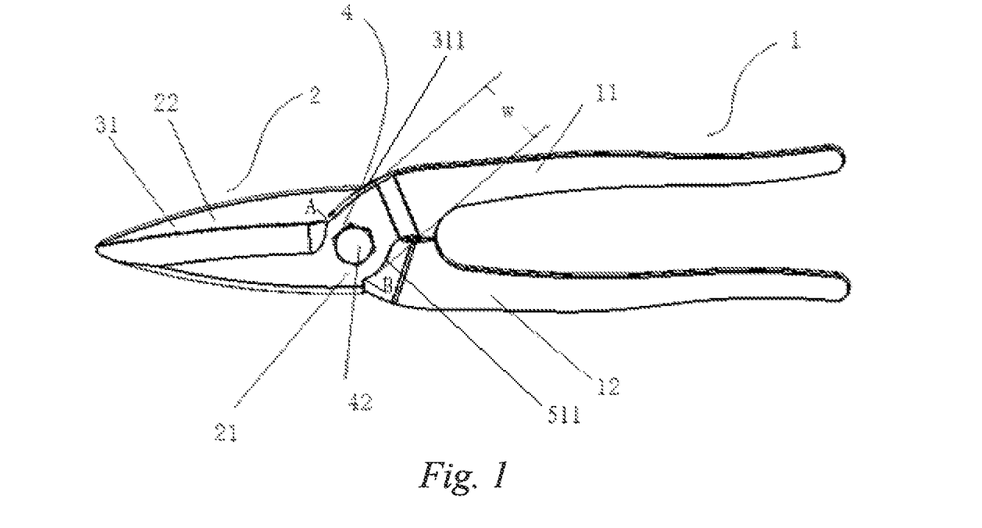
FIG. 1 is a schematic top view of scissors of a preferred embodiment of the present invention.
Figure 2:
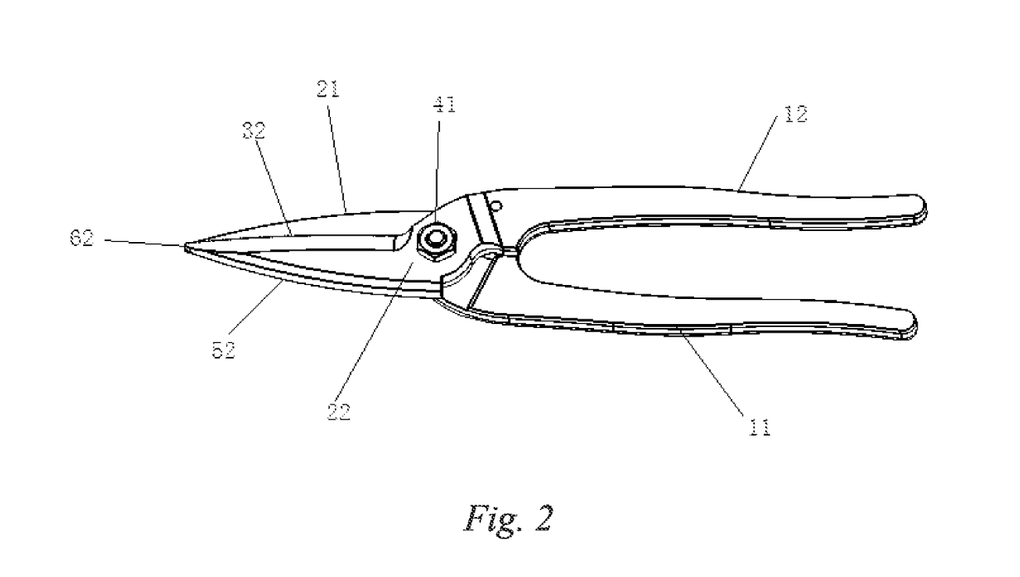
FIG. 2 is a bottom view of the scissors in FIG. 1.

FIGS. 1 and 2 are schematic structural views of scissors of a preferred embodiment of the present invention. In this embodiment, the scissors comprise handles 1 and scissors heads 2. The handles 1 comprise a first handle 11 and a second handle 12. The scissors heads comprise a first scissors head 21 and a second scissors head 22, wherein the first scissors head 21 is provided with a first blade 31, and the first scissors head 21 extends from one end of the first handle 11; the second scissors head 22 is provided with a second blade 32, and the second scissors head 22 extends from one end of the second handle 12; and the first scissors head 21 is pivotally hinged to the second scissors head 22 via a pivoting structure 4, and the first scissors head 21 has a width to thickness ratio of no more than 8.0 at the connection between the scissors heads 2 and the pivoting structure 4. The width to thickness ratio refers to the ratio of the width w to the thickness of the scissors head. Preferably, the first scissors head 21 has a width to thickness ratio of no more than 6.0 at the connection between the scissors heads 2 and the pivoting structure 4; and more preferably, the first scissors head 21 has a width to thickness ratio of no more than 4.0 at the connection between the scissors heads 2 and the pivoting structure 4.

As shown in FIG. 1, the first scissors head 21 is provided with the first blade 31 and a first outer edge 51 opposite the first blade, and the first scissors head 21 extends from one end of the first handle 11; the second scissors head 22 is provided with the second blade 32 and a second outer edge 52 opposite the second blade, and the second scissors head 22 extends from one end of the second handle 12; the first scissors head 21 has a first connection segment connected to the first handle 11, the second scissors head 22 has a second connection segment connected to the second handle 12, and the first connection segment is connected to the second connection segment via a pivoting structure; and the first connection segment has a first edge 311 extending between the first blade 31 and the first handle 11 and a second edge 511 extending between the first outer edge 51 and the first handle 11, wherein a distal end A of the first edge 311 is securely connected to the first blade 31; wherein a distal end B of the second edge 511 is securely connected to the first outer edge 51; wherein the width of the first connection segment is the width extending between the distal end A of the first edge 311 and the distal end B of the second edge 511, that is, the length w of the line connecting A and B, and the thickness of the first connection segment is the thickness corresponding to the position with the width, that is, the thickness herein refers to the average thickness of the first connection segment corresponding to the position of the AB straight line; and the first connection segment of the first scissors head has a width to thickness ratio of no more than 8.0.

The second scissors head 22 has a width to thickness ratio of no more than 8.0 at the connection between the scissors heads 2 and the pivoting structure 4. Preferably, the second scissors head 22 has a width to thickness ratio of no more than 6.0 at the connection between the scissors heads 2 and the pivoting structure 4; and more preferably, the second scissors head 22 has a width to thickness ratio of no more than 4.0 at the connection between the scissors heads 2 and the pivoting structure 4.

Each of the scissors heads is provided with a blade and an outer edge opposite the blade.

In this embodiment, the first scissors head 21 and the second scissors head 22 are formed by forging. Preferably, the first scissors head 21 and the second scissors head 22 have a thickness of 3-8 mm at a pivot connection. More preferably, the first scissors head 21 and the second scissors head 22 have a thickness of 4-6 mm at the pivot connection.

Most preferably, the first scissors head 21 and the second scissors head 22 have a thickness of 5 mm at the pivot connection.

The pivoting structure 4 comprises a bolt 41 and a nut 42.

In this embodiment, the scissors head has a smaller width to thickness ratio, which greatly increases the rigidity of the scissors head, enhances the shear-compression intensity of the scissors, and facilitates the cutting of thick objects. With forging technology, in addition to increasing the thickness of the scissors head, reducing the width to thickness ratio of the scissors head, and enhancing the rigidity of the scissors head, it is also convenient to mark a logo on the scissors head under the premise of ensuring the rigidity of the scissors head, so as to deepen the user's impression of product brand and other information. This is not available with the conventional scissors head made of stamped sheet metal.

The pivoting structure 4 is further provided with a washer 43, the washer 43 is provided with a through hole, and the bolt 41 passes through the first scissors head 21, the second scissors head 22 and the through hole of the washer 43 and is fixed by the nut 42; and the washer 43 is provided with an uneven texture to enhance the friction between the washer 43 and the nut 42, so as to improve the fastening effect of the pivoting structure. Further, the pivoting structure 4 may be provided with two washers, the two washers are each provided with a through hole, and the bolt 41 passes through the through hole of the first washer, the first scissors head 21, the second scissors head 22 and the through hole of the second washer respectively and is fixed by the nut 42, thereby further enhancing the fastening effect of the pivoting structure.

The first scissors head 21 is provided with the first blade 31 and the first outer edge 51 opposite the first blade, with a pointed head 61 being provided between the first blade 31 and the first outer edge 51; and the second scissors head 22 is provided with the second blade 32 and the second outer edge 52 opposite the second blade, with a pointed head 62 being provided between the second blade 32 and the second outer edge 52.

The pointed head 61 of the first scissors head 21 has a width to thickness ratio of no more than 0.5; and the pointed head 62 of the second scissors head 22 has a width to thickness ratio of no more than 0.5.

The pointed head of the scissors head can extend into the narrow operation space to adapt to different operational requirements; at the same time, compared to the head of the conventional scissors head made of stamped sheet metal, in this embodiment, the pointed head of the scissors head has a smaller width to thickness ratio, which greatly increases the rigidity of the head of the scissors head, enhances the shear-compression intensity of the head of the scissors head, facilitates the cutting of thick objects, and meets the requirements of various objects to be operated.

In a preferred embodiment of the present invention, the thickness of the part between the first blade 31 and the first outer edge 51 is greater than the thickness at the first outer edge, and the thickness of the part between the second blade 32 and the second outer edge 52 is greater than the thickness at the second outer edge. Different from the conventional scissors made of stamped sheet metal, the part between the blade of the scissors head and the outer edge thereof is thickened in this embodiment, which greatly increases the rigidity of the scissors head, further strengthens the endurance of the scissors head, enhances the shear-compression intensity of the scissors, facilitates the cutting of thick objects, and is suitable for different shear-compression requirements.

The thickened part between the blade of the scissors head and the outer edge thereof may be composed of faces having different inclinations and different width to thickness ratios. The part between the first blade 31 and the first outer edge 51 of the first scissors head is provided, from the inside to the outside, with faces respectively having different inclinations; likewise, the part between the second blade 32 and the second outer edge 52 of the second scissors head is provided, from the inside to the outside, with faces respectively having different inclinations. From the inside to the outside is the direction from the blade to the outer edge of the respective scissors head. The inclination is an included angle between a face of the scissors head and the blade thereof.

The scissors head in this embodiment is provided with faces having different width to thickness ratios and inclinations between the blade and the outer edge thereof, so that the rigidity performance of different parts of the scissors is more rationally designed, and the mechanical properties of the scissors head when applying a force are optimized. The scissors with this design can cut thick metal, tree branches, etc. even with a compact structure.

Figure 6:
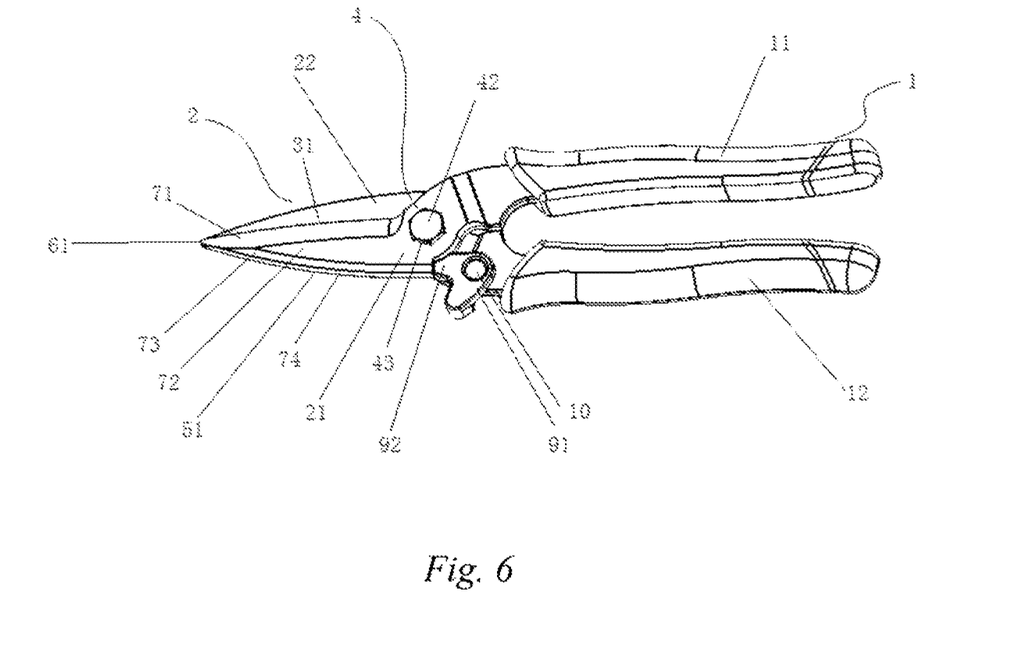
FIG. 6 is a schematic structural view of scissors of a preferred embodiment of the present invention.

Scissors of a preferred embodiment of the present invention are shown in FIG. 6. The part between the first blade 31 and the first outer edge 51 of the first scissors head is provided, from the inside to the outside, with a first face 71, a second face 72, a third face 73 and a fourth face 74 respectively having different inclinations. The first face has a width to thickness ratio of no more than 3.5, the second face has a width to thickness ratio of no more than 3.2, the third face has a width to thickness ratio of no more than 3, and the fourth face has a width to thickness ratio of no more than 2.5. The inclination of the first face is 30 degrees, the inclination of the second face is 10 degrees, the inclination of the third face is 3 degrees, and the inclination of the fourth face is 35 degrees.

The structure of the second scissors head is the same as that of the first scissors head.

The scissors head in this embodiment is provided with faces having different width to thickness ratios and inclinations between the blade and the outer edge thereof, so that the rigidity performance of different parts of the scissors is more rationally designed, and the mechanical properties of the scissors head when applying a force are optimized. The scissors with this design can cut thick metal, tree branches, etc. even with a compact structure.

Figure 3:
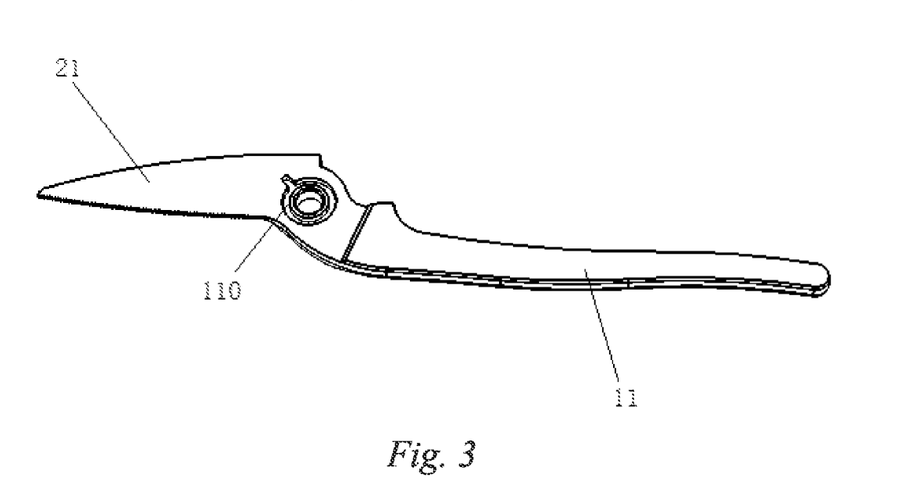
FIG. 3 is a schematic structural view of a first scissors head and a first handle of scissors of a preferred embodiment of the present invention.
Figure 4:
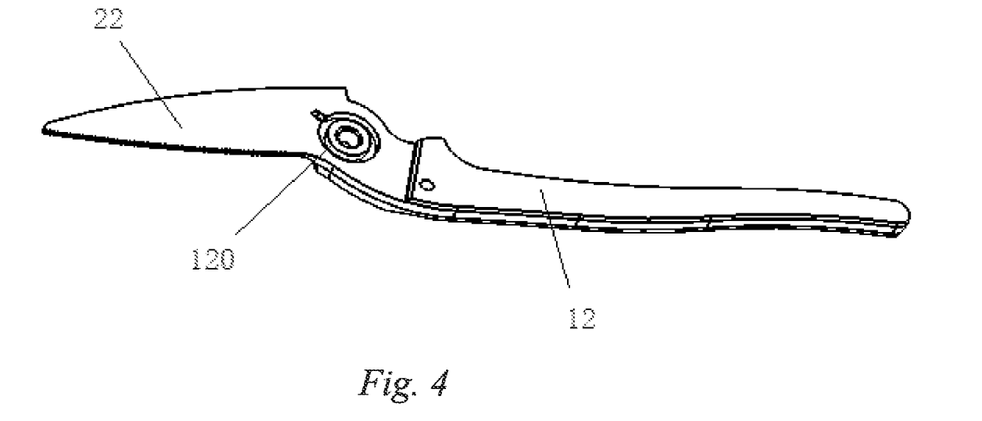
FIG. 4 is a schematic structural view of a second scissors head and a second handle of scissors of a preferred embodiment of the present invention.
Figure 5:
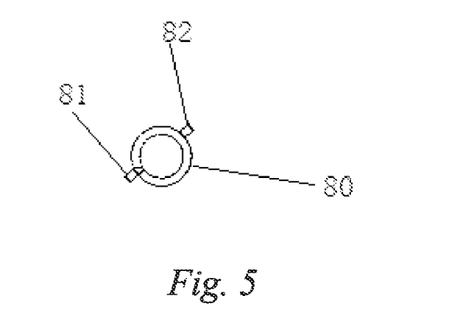
FIG. 5 is a schematic structural view of a torsion spring in scissors of a preferred embodiment of the present invention.

FIGS. 3-5 are schematic structural views of a torsion spring and a cooperation part thereof in the scissors of a preferred embodiment of the present invention. In this embodiment, the scissors are provided with a torsion spring 8, the torsion spring 8 is located between the first scissors head 21 and the second scissors head 22, and the torsion spring 8 is arranged such that the torsion spring 8 does not deform when there is no external force applied to the handle, and the torsion spring 8 is deformed when there is an external force applied to the handle.

In this embodiment, the torsion spring 8 has an annular portion 80, a first extension portion 81 and a second extension portion 82, the first scissors head is provided with a first slot 110, the second scissors head is provided with a second slot 120, a part of the annular portion 80 and the first extension portion 81 of the torsion spring are embedded into the first slot 110, and another part of the annular portion 80 and the second extension portion 82 of the torsion spring are embedded into the second slot 120.

The scissors provided in this embodiment have a built-in torsion spring, and such an arrangement makes the torsion spring not prone to damage, the shape of the entire scissors simple, and the structure compact; when the object is being sheared and compressed, the resistance of the spring can be overcome just by applying appropriate forces to the first handle and the second handle, so that the scissors are comfortable to use; and after the end of application of the forces to the handles, the torsion spring restores its shape, so that the first scissors head and the second scissors head are separated for the next operation.

In a preferred embodiment of the present invention, the second scissors head 22 or the second handle 12 is provided with a retaining component 9, the retaining component 9 has a first end 91 and a second end 92, the first end 91 is pivotally connected to the second scissors head 22 or the second handle 12, and the second end 92 is arranged such that when the heads of the first scissors head 21 and the second scissors head 22 are aligned, the second end 92 rotates about the first end 91 and abuts against the first scissors head 21 to prevent the first scissors head 21 from rotating. The retaining component 9 facilitates placement of the scissors and prevention of scratches when the scissors are not used. FIG. 6 shows the scissors having a retaining component, with the first end 91 of the retaining structure being pivotally connected to the second scissors head 22 via a pivoting mechanism 10. The handle of the scissors shown in FIG. 6 is also coated with a coating layer to increase the comfort of use.

Figure 7:
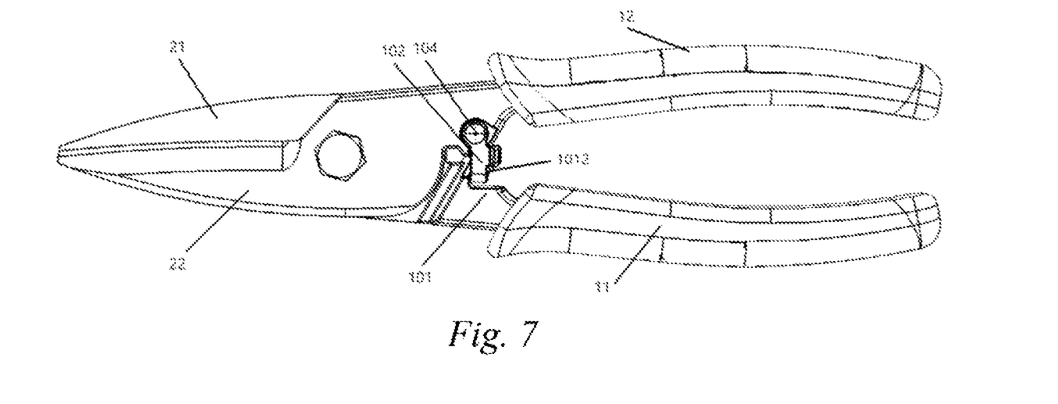
FIG. 7 is a schematic view of scissors provided with a locking device of a preferred embodiment of the present invention in a locked state.
Figure 8:
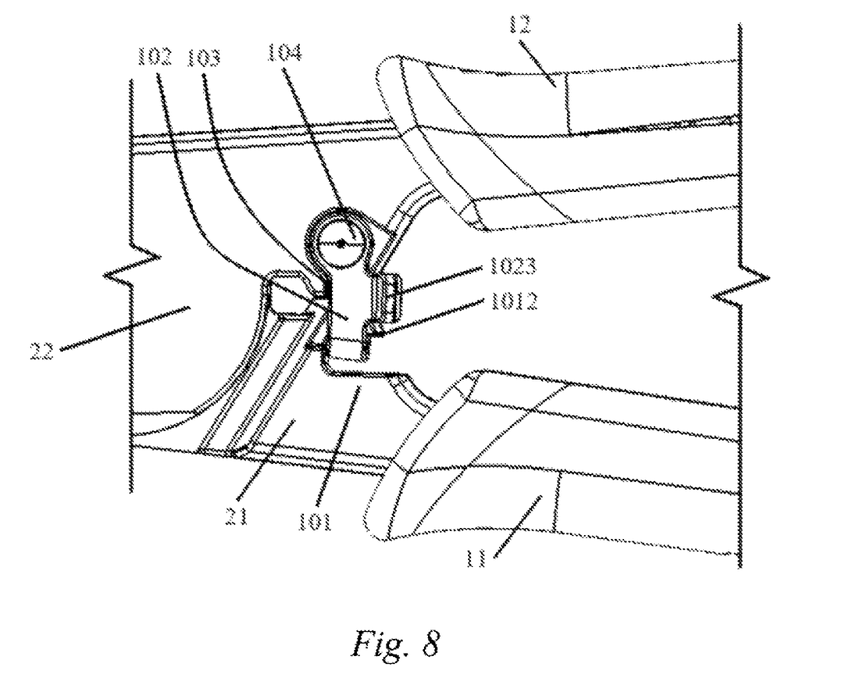
FIG. 8 is a partially enlarged schematic view of the scissors provided with the locking device of the embodiment in FIG. 7 of the present invention in the locked state.
Figure 9:
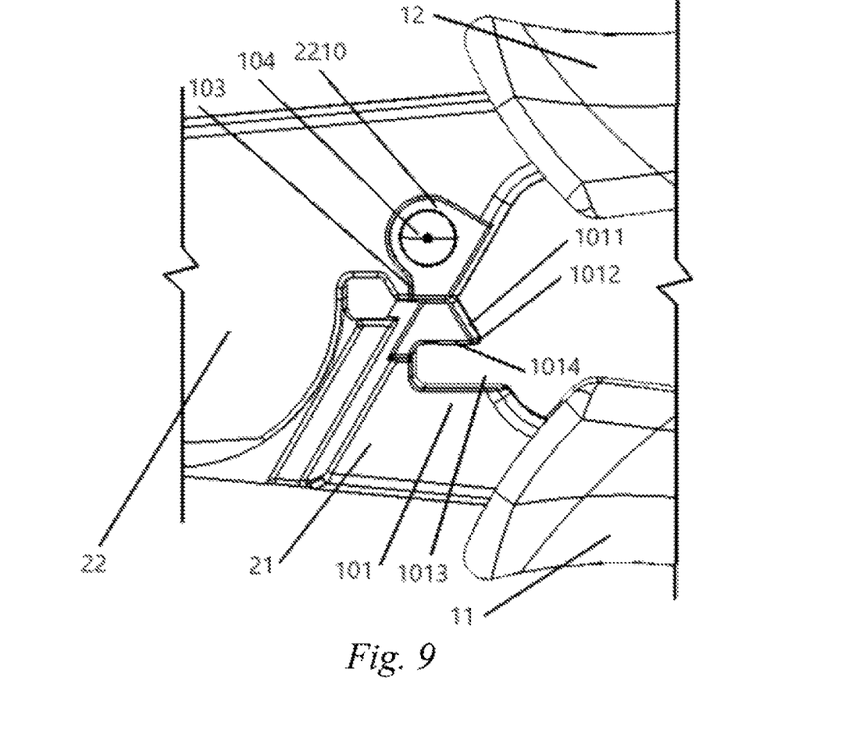
FIG. 9 is a partially enlarged schematic view of the scissors provided with the locking device of the embodiment in FIG. 7 of the present invention with the locking device being hidden.

As shown in FIGS. 7, 8, 9, 10 and 11, in a preferred embodiment of scissors provided with a locking device of the present invention, the scissors comprise a locking device 102 and a locking cooperation part 101, the two cooperate to lock the first scissors head 21 and the second scissors head 22 in a locked position (in the position as shown in FIG. 7). The locking cooperation part 101 is integrally formed with the first scissors head 21, and the locking cooperation part 101 is provided with an inclined face 1011; in operation, when the first scissors head 21 and the second scissors head 22 are in an open position, the locking device 102 may be rotated to come close to the locked position, the forces are applied to the handles at this time such that the handles are brought together, and the inclined face 1011 of the locking cooperation part can automatically slide the locking device 102 to avoid damage to the locking device 102; and the integral formation of the locking cooperation part 101 and the first scissors head 21 can ensure a good stress distribution between the locking cooperation part 101 and the first scissors head 21.

In this embodiment, the locking device 102 is a U-shaped component comprising an opening end 1021 and a U-shaped end 1022, wherein the opening end 1021 of the U-shaped component clamps two opposite sides of the second scissors head 22, and the opening end 1021 of the U-shaped component is rotatably connected to the two opposite sides of the second scissors head 22 via a rivet 104; the locking device 102 is provided with two protrusions 1023, and the two protrusions 1023 are saddle-shaped; and during operation, the two saddle-shaped protrusions 1023 can be hand-held to rotate the locking device 102 to achieve locking or opening, and at the same time, when the locking device 102 is opened from the locked state, the two saddle-shaped projections may fall onto the first handle 11, and the impulsive force due to the U-shaped component falling onto the first handle in the open state is buffered, thereby protecting the U-shaped component.

The inclined face 1011 of the locking cooperation part 101 is provided with a locking notch 1013, and a first face 1014 of the locking notch 1013 forms an outwardly-extending protruding tip 1012 with the inclined face 1011 of the locking cooperation part. When the scissors are in the locked state, the U-shaped end 1022 of the locking device is embedded into the locking notch 1013, and the protruding tip 1012 passes through the U-shaped end 1022 of the locking device and extends outwardly. The term "outwardly" herein refers to the direction facing away from the scissors head. When the scissors are in the locked state, the U-shaped end 1022 of the locking device is embedded into this locking notch 1013, so that the locking device can be prevented from being automatically opened in the locked state; and when the scissors are in the locked state, the protruding tip 1012 passing through the U-shaped end 1022 of the locking device makes the scissors locked more securely, and the protruding tip 1012 is integrally formed with the first scissors head 21, so that the stress distribution is uniform, and the protruding tip 1012 is not easily bent or broken.

Figure 10:
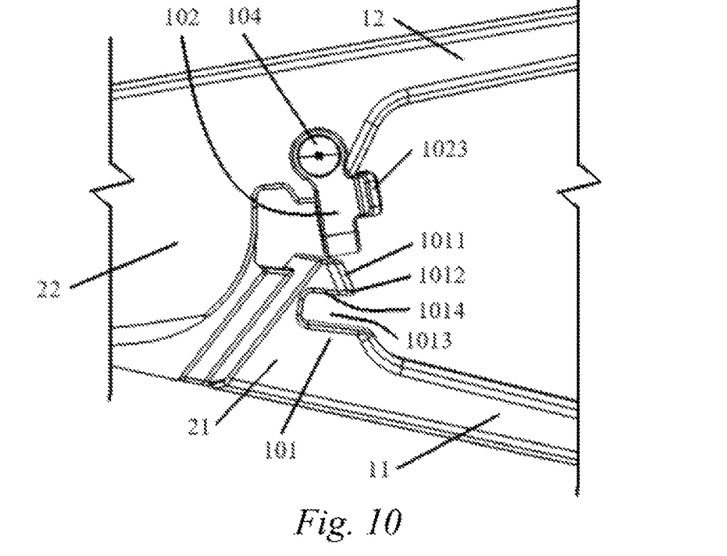
FIG. 10 is a partially enlarged schematic view of the scissors provided with the locking device of the embodiment in FIG. 7 of the present invention in a partially-opened state.
Figure 11:
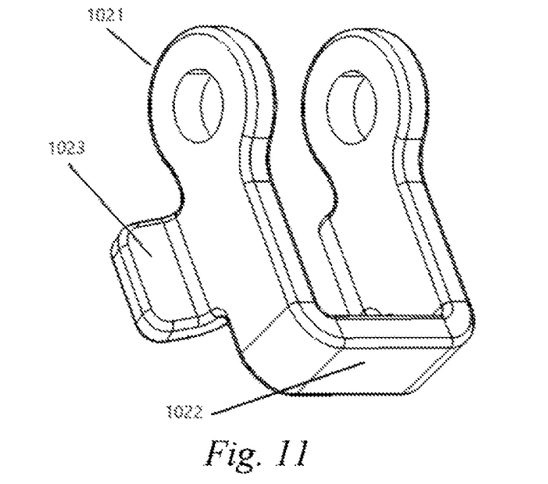
FIG. 11 is a schematic view of the locking device of the scissors of the embodiment in FIG. 7 of the present invention.

The scissors further comprise a stop portion 103, as shown in the figures, the stop portion 103 being arranged on the second scissors head 22. A side face of the second scissors head 22 is provided with a recessed region 2210, one end of the opening end 1021 of the locking device is clamped within this recessed region 2210 and is rotatably connected thereto via the rivet 104, and a side wall of the recessed region 2210 forms a stop for the locking device 102 from passing beyond the locked position, thereby forming the stop portion 103. The expression "passing beyond the locked position" used herein refers to the locking device, that is already in the locked state (in the position as shown in FIG. 7), continuing to rotate in the direction from the open state to the locked state. As shown in FIG. 10, which is a schematic view of the partially-opened scissors, at this time, the U-shaped end 1022 of the locking device continues to rotate in the direction of the second handle 12 with the rivet 104 as an axis until the two protrusions 1023 fall onto the second handle 12, and this state is a completely-opened state.

Figure 12:
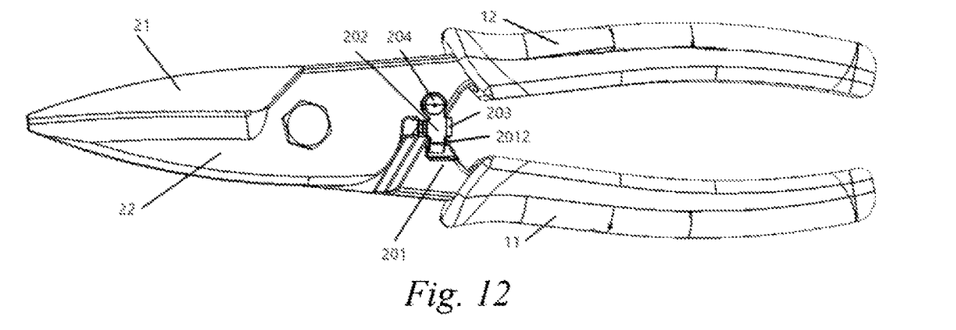
FIG. 12 is a schematic view of scissors provided with a locking device of a further preferred embodiment of the present invention in a locked state.
Figure 13:
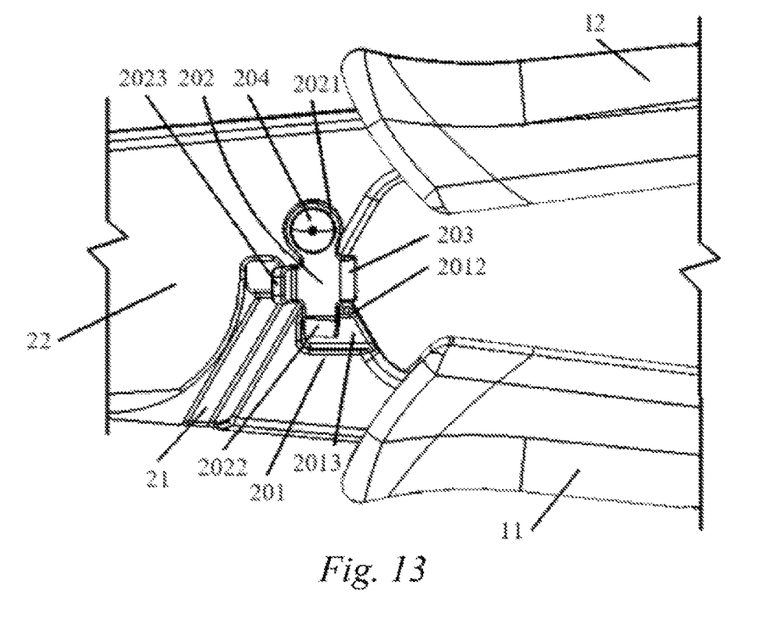
FIG. 13 is a partially enlarged schematic view of the scissors provided with the locking device of the embodiment in FIG. 12 of the present invention in the locked state.
Figure 14:
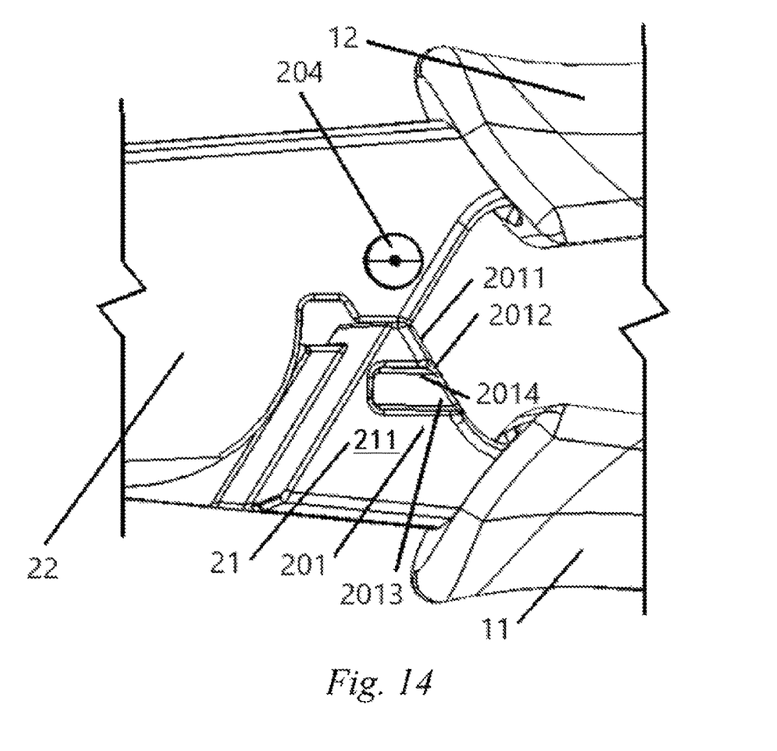
FIG. 14 is a partial schematic view of the scissors provided with the locking device of the embodiment in FIG. 12 of the present invention with the locking device being hidden.

As shown in FIGS. 12, 13, 14, 15 and 16, in a further preferred embodiment of scissors provided with a locking device of the present invention, the scissors comprise a locking device 202 and a locking cooperation part 201, the two cooperate to lock the first scissors head 21 and the second scissors head 22 in a locked position (in the position as shown in FIG. 12). The locking cooperation part 201 is integrally formed with the first scissors head 21, and the locking cooperation part 201 is provided with an inclined face 2011 which is inclined relative to a surface 211 of the first scissors head 21, wherein the surface 211 faces out of the page as shown in FIG. 14. In operation, when the first scissors head 21 and the second scissors head 22 are in an open position, the locking device 202 may be rotated to come close to the locked position, the forces are applied to the handles at this time such that the handles are brought together, and the inclined face 2011 of the locking cooperation part can automatically slide the locking device 202 to avoid damage to the locking device 202; and the integral formation of the locking cooperation part 201 and the first scissors head 21 can ensure a good stress distribution between the locking cooperation part 201 and the first scissors head 21.

In this embodiment, the locking device 202 is a hook comprising a first end 2021 and a second end 2022, wherein the first end 2021 is attached to a side face of the second scissors head 22 and is rotatably connected thereto via a rivet 204, and the second end is an inwardly bent portion, where the term "inwardly" herein refers to the direction facing toward the scissors head; a first lateral end 2023 of the locking device 202 is an outwardly bent portion, where the term "outwardly" refers to the direction facing away from the scissors head; and during operation, the first lateral end 2023 can be hand-held to rotate the locking device 202 to achieve locking or opening, and at the same time, when the locking device 202 is opened from the locked state, the first lateral end 2023 may fall onto the first handle 11, and the impulsive force due to the hook falling onto the first handle in the open state is buffered, thereby protecting the hook.

A side face of the locking cooperation part 201 is provided with a locking groove 2013, and the side face of the locking cooperation part 201 is part of the surface 211 of the first scissors head 21, and a first face 2014 of the locking groove 2013 forms an outwardly-extending protruding tip 2012 with the inclined face 2011 of the locking cooperation part. When the scissors are in the locked state, the second end 2022 of the hook is embedded into the locking groove 2013, and the protruding tip 2012 passes through the second end 2022 of the locking device and extends outwardly. The term "outwardly" herein refers to the direction facing away from the scissors head. The second end 2022 of the locking device 202 can slide in and out within the locking groove 2013. When the scissors are in the locked state, the second end 2022 of the locking device slides into the locking groove 2013; and when the scissors are in the open state; the second end 2022 of the locking device slides out of the locking groove 2013. When the scissors are in the locked state, the second end 2022 of the locking device is embedded into this locking groove 2013, so that the locking device can be prevented from being automatically opened in the locked state; and the protruding tip 2012 passing through the second end 2022 of the hook makes the scissors locked more securely, and the protruding tip 2012 is integrally formed with the first scissors head 21, so that the stress distribution is uniform, and the protruding tip 2012 is not easily bent or broken.

Figure 15:
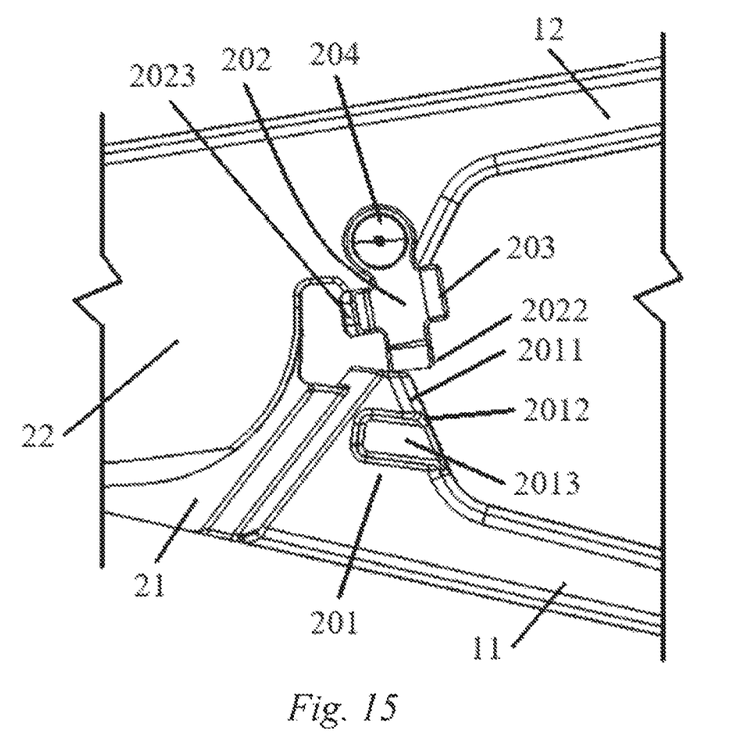
FIG. 15 is a partially enlarged schematic view of the scissors provided with the locking device of the embodiment in FIG. 12 of the present invention in a partially-opened state.
Figure 16:
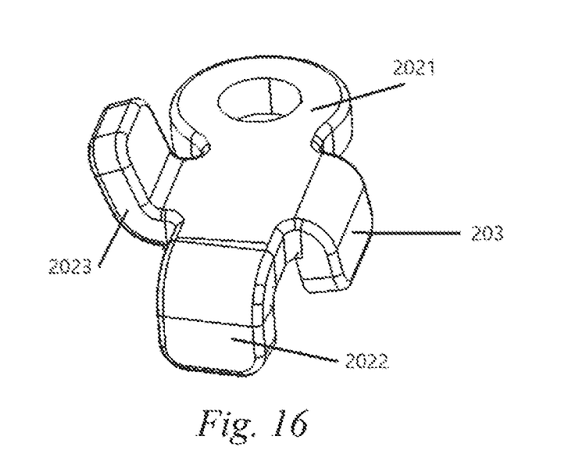
FIG. 16 is a schematic view of the locking device of the scissors of the embodiment in FIG. 12 of the present invention.

The scissors further comprise a stop portion 203, as shown in the figures, the stop portion 203 being an inwardly bent portion provided at a second lateral end of the hook of the locking device. When rotated as the locking device 202 from the open position to the locked position, the stop portion 203 will be engaged onto the scissors head to prevent the locking device 202 from passing beyond the locked position. The expression "passing beyond the locked position" used herein refers to the locking device, that is already in the locked state (in the position as shown in FIG. 12), continuing to rotate in the direction from the open state to the locked state. As shown in FIG. 15, which is a schematic view of the partially-opened scissors, at this time, the second end 2022 of the locking device continues to rotate in the direction of the second handle 12 with the rivet 204 as an axis until the locking device 202 comes into contact with the second handle 12, and this state is a completely-opened state.

The preferred embodiments of the present invention are described in detail above. It should be understood that many modifications and variations can be made by a person of ordinary skill in the art according to the concept of the present invention without involving any inventive effort. Therefore, any technical solution that can be obtained by a person skilled in the art based on the prior art by means of logic analysis, reasoning or limited trials should be within the scope of protection determined by the claims.

The invention claimed is:

1. Scissors, which comprise handles and scissors heads, the handles comprising a first handle and a second handle, the scissors heads comprising a first scissors head and a second scissors head, the first scissors head comprising a first blade and extending from one end of the first handle, the second scissors head comprising a second blade and extending from one end of the second handle, and the first scissors head being pivotally hinged to the second scissors head via a pivoting structure, wherein the scissors further comprises a locking device, and the first scissors head comprises an inclined face and a locking groove, wherein the locking groove is provided on a surface of the first scissors head, and the inclined face is provided next to the locking groove and is inclined relative to the surface of the first scissors head, and the inclined face and the locking groove being used to cooperate with the locking device;

wherein a first end of the locking device is rotatably connected to the second scissors head by a rivet; the locking device being configured to rotate about the rivet; and the locking device further comprising a stop portion, the stop portion being configured to cooperate with the inclined face to prevent the locking device from rotating beyond a locked position, wherein, when the locking device is in the locked position, a second end of the locking device clamps into the locking groove;

wherein a side of the locking groove forms an outwardly-extending protruding tip with the inclined face, the protruding tip being configured to be positioned on a side of the locking device when the locking device is in the locked position.

2. The scissors of claim 1, wherein the second end of the locking device is provided with an inwardly bent portion, the bent portion being configured to be engaged in the locking groove when the locking device is in the locked position.

3. The scissors of claim 1, wherein the first scissors head and the second scissors head are formed by forging.

* * * * *